United States Patent [19]
Nemirovsky et al.

[11] Patent Number: 5,717,909
[45] Date of Patent: Feb. 10, 1998

[54] CODE BREAKPOINT DECODER

[75] Inventors: Mario D. Nemirovsky; Robert James Divivier; Robert Walter Williams, all of San Jose, Calif.

[73] Assignee: National Semiconductor Corporation, Santa Clara, Calif.

[21] Appl. No.: 451,198

[22] Filed: May 26, 1995

[51] Int. Cl.$^6$ .............................. G06F 11/30; G06F 9/30
[52] U.S. Cl. ................ 395/568; 364/275.5; 395/183.06; 395/185.04; 395/704
[58] Field of Search ..................... 395/704, 800, 395/375, 185.04, 568, 183.06; 364/275.5

[56] References Cited

U.S. PATENT DOCUMENTS

| | | | |
|---|---|---|---|
| 4,860,195 | 8/1989 | Krauskopf | 364/200 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,263,153 | 11/1993 | Intrater et al. | 395/575 |
| 5,404,473 | 4/1995 | Papworth et al. | 395/375 |
| 5,408,626 | 4/1995 | Dixit | 395/400 |
| 5,453,927 | 9/1995 | Matsuo et al. | 395/375 |
| 5,485,587 | 1/1996 | Matsuo et al. | 395/375 |
| 5,542,075 | 7/1996 | Ebcioglu et al. | 395/700 |

FOREIGN PATENT DOCUMENTS

| | | |
|---|---|---|
| 0474256 | 3/1993 | European Pat. Off. . |
| 2593621 | 7/1987 | France . |

OTHER PUBLICATIONS

Serra, Micaela & Dervisoglu, Bulent I., "Testing", Chapter 79, *The Electrical Engineering Handbook*, Richard C. Dorf, Editor-in-Chief, pp. 1808–1837, CRC Press.

L–T Wang et al. "Feedback Shift Registers For Self–Testing Circuits", *VLSI System Design*, Dec. 1986.

Masakazu Shoji, "CMOS Dynamic Gates", Chapter 5, *AT&T CMOS Digital Circuit Technology*, Prentice Hall, 1988, pp.210–257.

Guthrie, Charles, "Power–On Sequencing For Liquid Crystal Displays, Why, When and How", *Sharp Application Notes*, Sharp Corporation, 1994, pp. 2–1 thru 2–9.

Bernd Moeschen, "NS32SP160 —Feature Communication Controller Architecture Specification", *National Semiconductor*, Rev. 1.0, May 13, 1993.

Agarwal, Rakesh K., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DNA Controller (8237A, 8237A-4, 8237A-5)", *Peripheral Components*, Intel, 1992, pp. 3–14 thru 3–50.

(List continued on next page.)

*Primary Examiner*—Kevin A. Kriess
*Assistant Examiner*—Michael T. Richey
*Attorney, Agent, or Firm*—Limbach & Limbach L.L.P.

[57] ABSTRACT

A computer with a pipelined processor and code breakpoints for performing software debug operations includes prefetch and decode stages, debug address registers for storing code breakpoints representing addresses of preselected instructions, and two digital comparators. During the instruction prefetch phase of operation, the first comparator compares the 29 most significant bits [31:3] of the 32-bit prefetch instruction address against the code breakpoints stored in the debug address registers and produces a 1-bit signal indicating whether such comparison results in a positive match. Subsequently, during the decode phase of operation, the second comparator compares the three least significant bits [2:0] of the 32-bit prefetch instruction address and produces a 1-bit signal indicating whether such comparison results in a positive match. These two 1-bit signals are then logically ANDed, synchronized with bit 3 [2] of the 32-bit prefetch instruction address to ensure that such two 1-bit signals are based upon corresponding comparisons of the same prefetch instruction address.

14 Claims, 9 Drawing Sheets

OTHER PUBLICATIONS

Kane, Gerry, "R2000 Processor Programming Model", Chapter 2, *MIPS RISC Architecture*, MIPS Computer Systems Inc.

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

12

CODE BREAKPOINT DECODER

BACKGROUND OF THE INVENTION

1. Field of Invention

The present invention relates to code breakpoint decoders used for debugging software in microprocessors, and in particular, to code breakpoint decoders in which decoding of the address information is performed in multiple steps in such a manner as to reduce the amount of support circuitry and processing time needed for such function.

2. Description of the Related Art

The use of code breakpoints for debugging software in a microprocessor is well known in the art. This debugging technique allows designers and users to debug software by causing a program to pause or stop at specified points in the execution of such program so as to allow various data or status registers to be monitored or tested. However, conventional code breakpoint techniques suffer from a number of disadvantages.

One disadvantage is the fact that a relatively significant amount of circuitry is required, particularly in the decode stage of a pipeline processor, to support the breakpoint function. Another disadvantage is that the processor pipeline itself is used for determining whether an address match exists, thereby introducing a delay into the normal processing of the program. In other words, with the pipeline pausing to perform the address match determination, the actual program is not performed at normal processing speed. This not only introduces a delay into the execution of the program, but also prevents the possibility of testing for most hardware-based problems (e.g. effects due to parasitic capacitances, etc.).

Accordingly, it would be desirable to have an improved code breakpoint technique which reduces the amount of circuitry required to support this function and minimizes delays in normal program execution while performing such function.

SUMMARY OF THE INVENTION

A computer with a pipelined processor and code breakpoints for performing debug operations in accordance with one embodiment of the present invention includes a debug register, a prefetch stage, a decode stage, an execution stage, and first and second comparison stages. The debug register is for receiving and storing breakpoint information representing an address of one of a plurality of preselected instructions. The prefetch stage is for receiving and storing program address information representing one of a plurality of program instructions and in accordance therewith receiving and storing binary information representing such program instruction. The decode stage is coupled to the prefetch stage and is for receiving and decoding the stored binary information and in accordance therewith providing decoded binary information representing such program instruction. The execution stage is coupled to the decode stage and is for receiving the decoded binary information and executing an operation in accordance with such decoded binary information. The first comparison stage is coupled to the debug register and the prefetch stage and is for receiving and comparing a first portion of the stored breakpoint information and a first portion of the stored program address information and in accordance therewith providing a first address match signal which indicates whether such first portions of the stored breakpoint and program address information match one another, wherein the comparison of such first portions of the stored breakpoint and program address information is performed simultaneously with the storing by the prefetch stage of the binary information representing the program instructions. The second comparison stage is coupled to the first comparison stage, the debug register and the prefetch stage and is for receiving and comparing a second portion of the stored breakpoint information and a second portion of the stored program address information and in accordance therewith providing a second address match signal which indicates whether such first and second portions of the stored breakpoint information match the first and second portions of the stored program address information, respectively.

These and other features and advantages of the present invention will be understood upon consideration of the following detailed description of the invention and the accompanying drawings.

DETAILED DESCRIPTION OF THE INVENTION

Figure 1A:
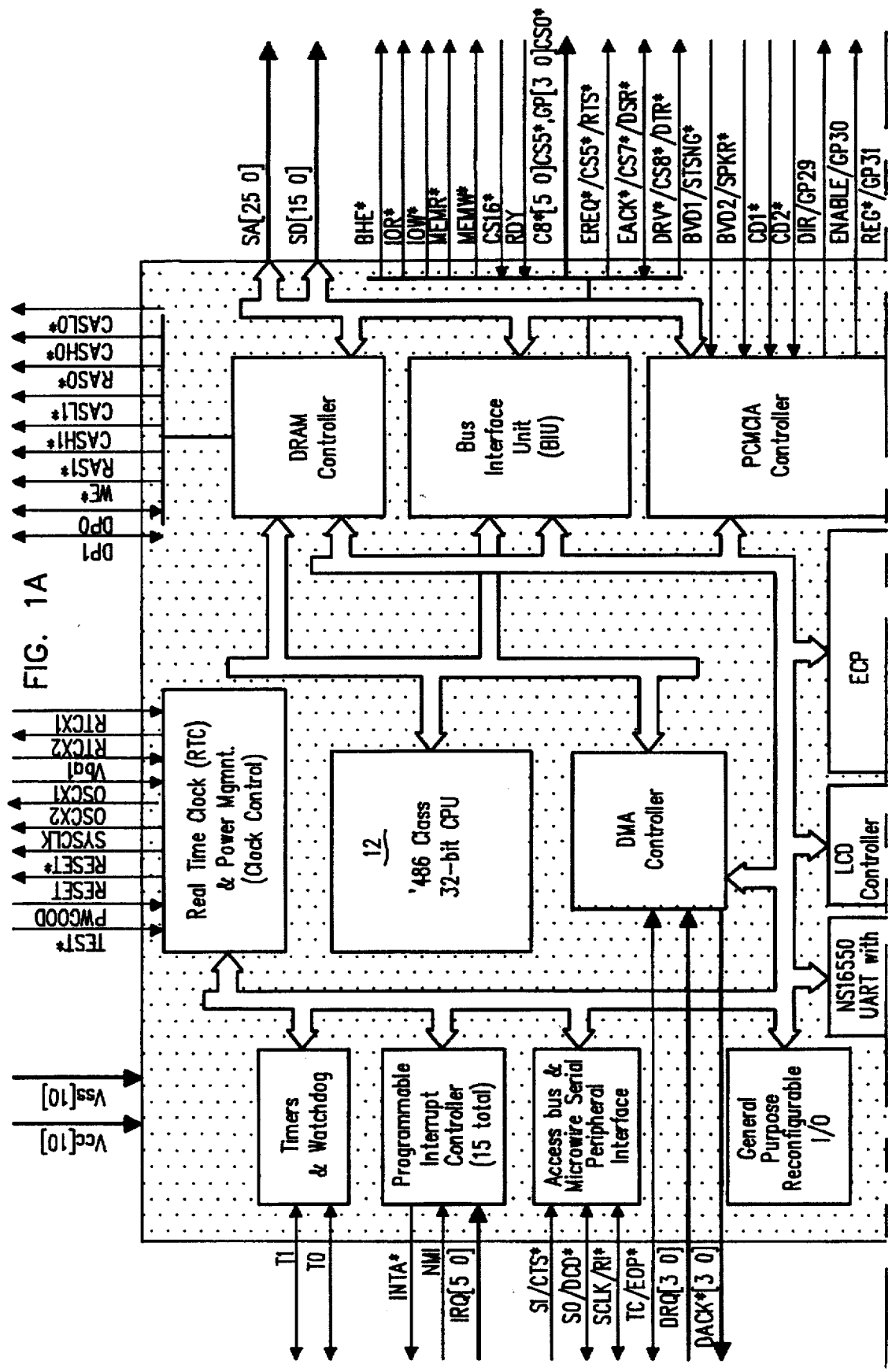
FIGS. 1A and 1B are a functional block diagram of an integrated circuit with a microprocessor which includes a code breakpoint design in accordance with the present invention.
Figure 1B:
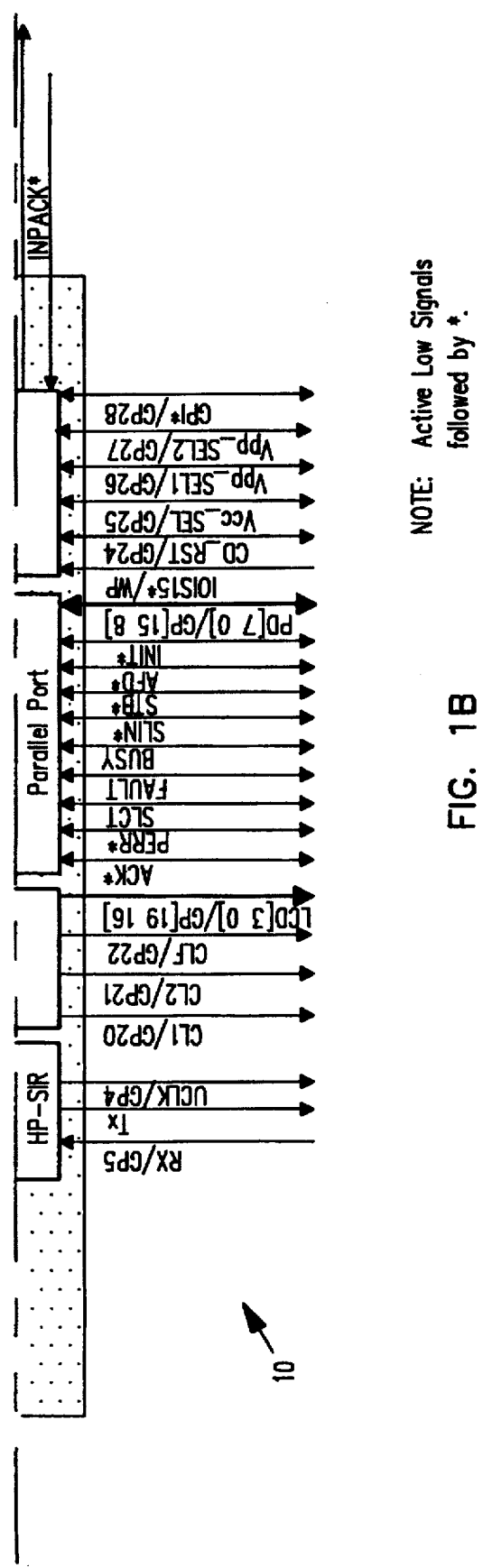
Figure 1B:
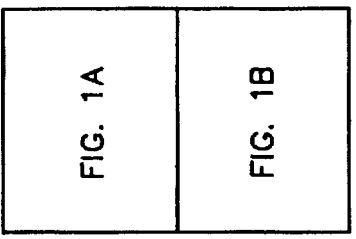
Figure 2:
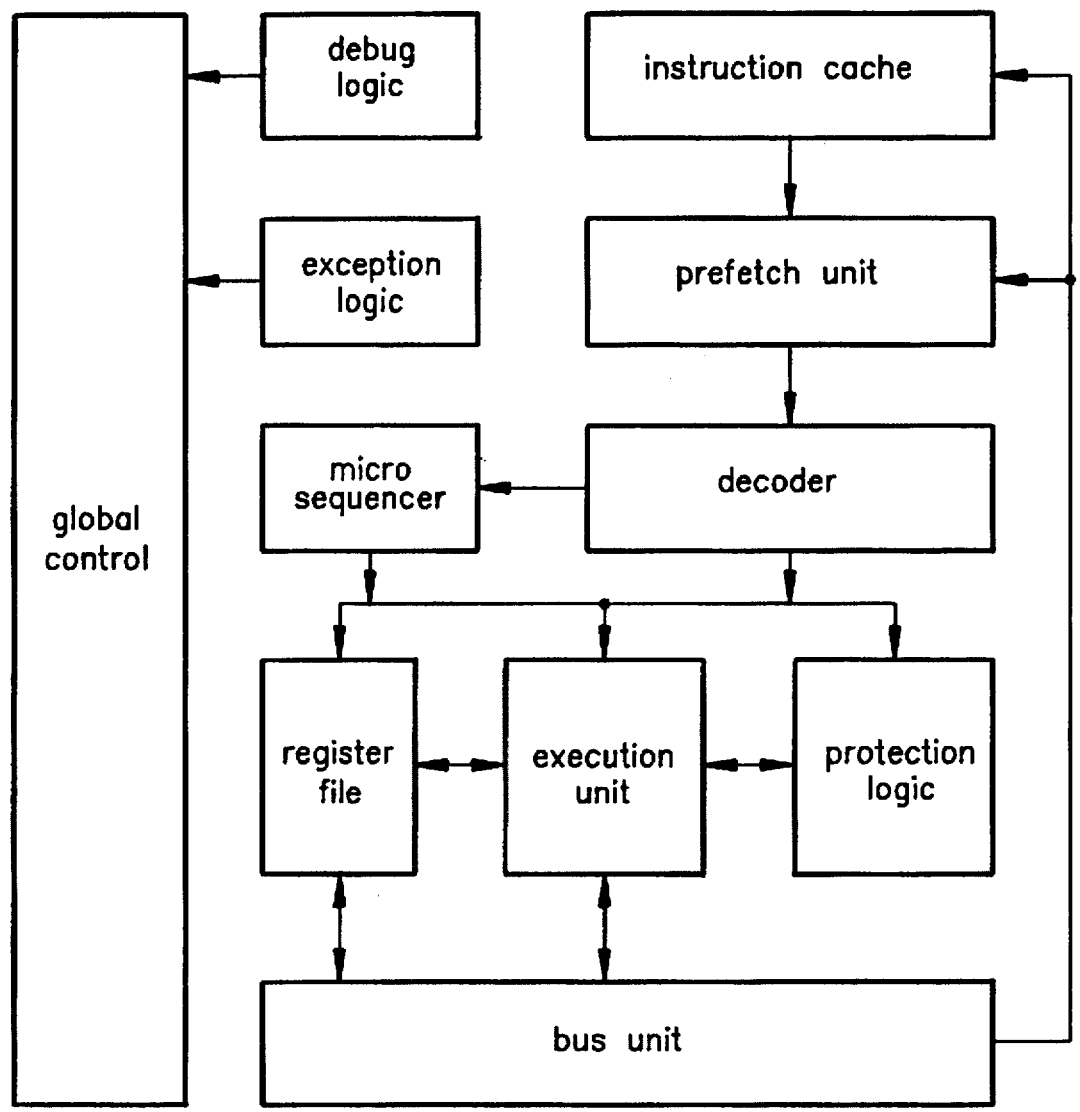
FIG. 2 is a high-level functional diagram of the microprocessor in FIG. 1A.

Referring to FIG. 1A, an integrated circuit 10 with a microprocessor 12 is ideally suited for using a code breakpoint design in accordance with the present invention. Referring to FIG. 2, such microprocessor 12 uses a pipeline design which includes prefetch, decoding, execution and write functions.

Figure 3:
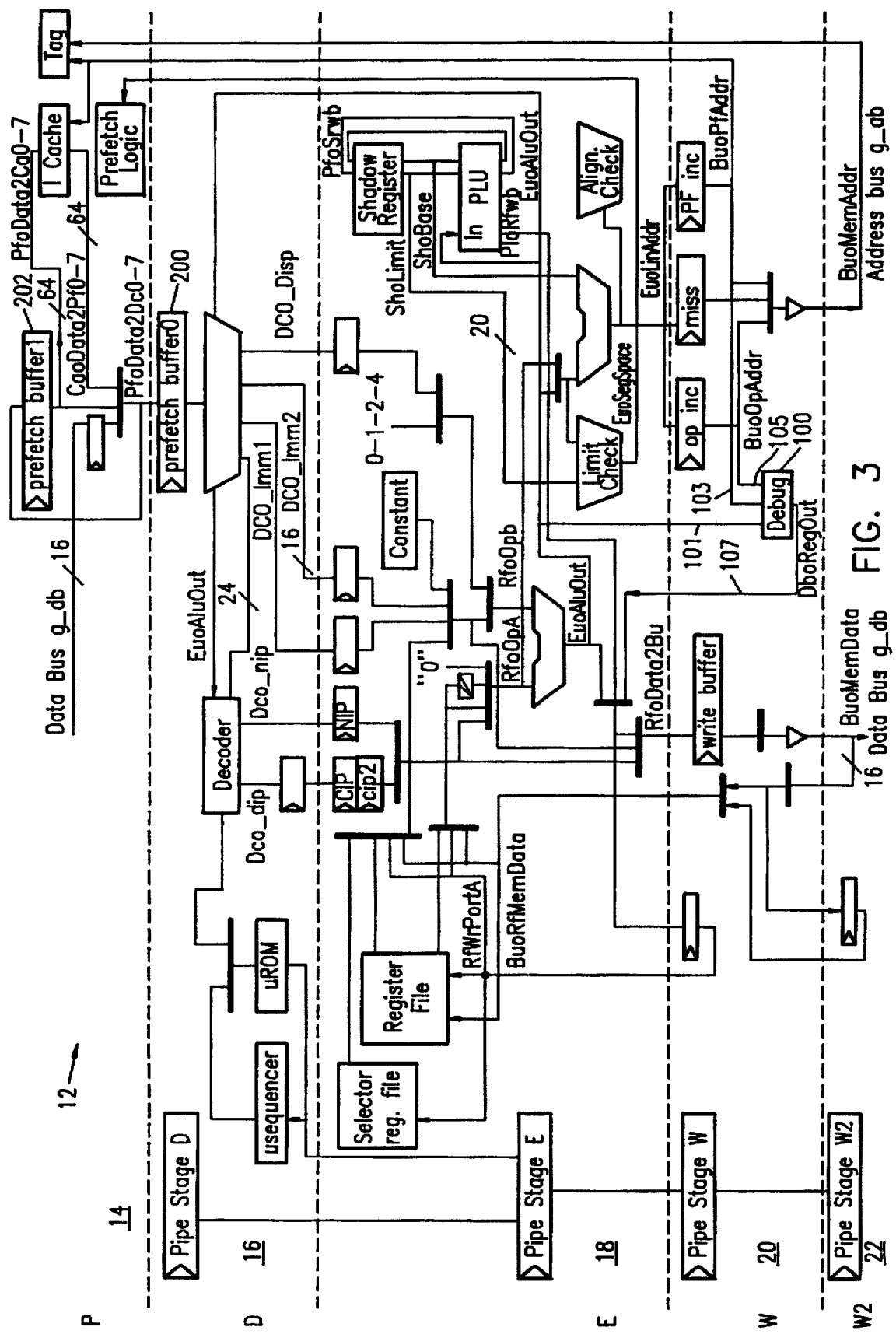
FIG. 3 is a detailed, functional block diagram of the pipeline of the microprocessor of FIG. 1A.

Referring to FIG. 3, the pipeline design for the microprocessor 12 is shown in more detail. A prefetch stage 14 fetches instructions from an instruction cache or directly from memory and provides such instructions to the decode stage 16. After decoding the instructions received from the prefetch stage 14, the decode stage 16 provides the entry microcode address for the instruction, register addresses, immediate values, displacement values and segment information to the execution stage 18. The execution stage performs the arithmetic and logic operations, as well as generate linear address information and limit checking. The primary write stage 20 and secondary write stage 22 complete the process by writing the results received from the execution stage 18 to either memory or a peripheral. The primary write stage 20 includes a debug section 100 which, as discussed in more detail below, is programmed with address information 101 for comparison with code address information 103 (for instructions) or data address information 105 (for data or operands) in accordance with which a 32-bit output 107 is provided to the execution stage 18.

As discussed in more detail below, the decode stage 16 includes a prefetch buffer 200 which is loaded via another prefetch buffer 202 in the prefetch stage 14 (or from cache or external memory). Each of these prefetch buffers 200, 202 is eight bytes wide, and together they are for receiving and storing the incoming instruction address information which will ultimately be decoded and/or compared against preprogrammed breakpoint information. Accordingly, with each prefetch buffer 200, 202 being eight bytes wide, the difference between the addresses of corresponding instruction bytes stored therein is B, where B=8 and $2^N$=B, and only bits [N:0] of such addresses will vary, where N=2. (It should be appreciated that the 8-byte width of these prefetch buffers 200, 202 is not mandatory and the widths of such buffers can be selected as desired.)

Figure 4:
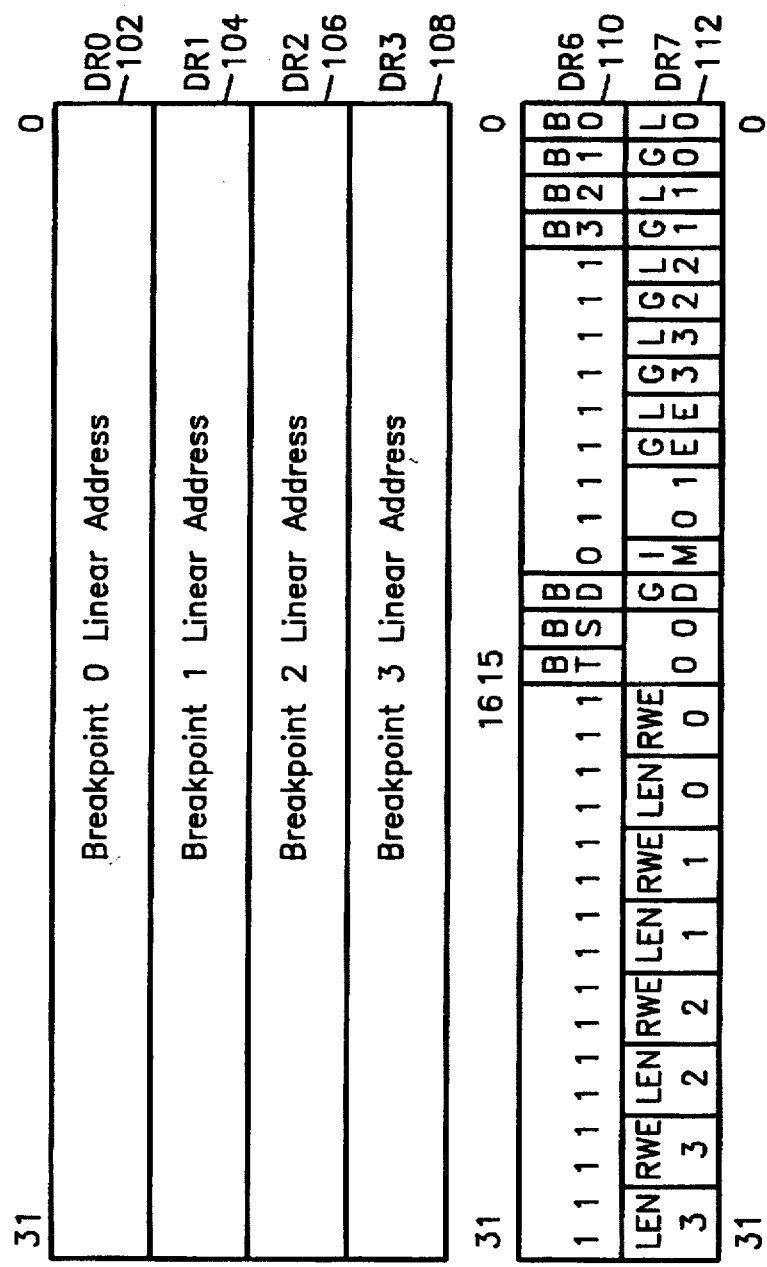
FIG. 4 represents the various debug registers forming the debug section shown in the primary write stage of the pipeline of FIG. 3.

Referring to FIG. 4, the debug section 100 includes four debug address registers 102, 104, 106, 108 for storing breakpoint address information and two debug control registers 110, 112 for storing control, configuration and status information. Such control, configuration and status information is identified below in Tables 1 and 2.

TABLE 1

FUNCTIONS OF DEBUG STATUS REGISTER BITS (DR6)
These bits are only set by hardware; software must clear them.

| Field | Function |
|---|---|
| B0–B3 | These bits are set to 1 by processor hardware when the breakpoint condition in the corresponding register (DR0–3) is met. The Debug Trap need not be enabled for these bits to be set. |
| BD | 1=Debug Trap was triggered because an attempt was made to access one of the Debug registers while the DR7 register's GD bit was set. |
| BS | 1=Debug Trap was triggered by the TF bit in the EFLAGS register (Single-Stepping). |
| BT | 1=Debug Trap was triggered by a task switch into a task whose T bit was set (in its TSS segment). |

TABLE 2

FUNCTIONS OF DEBUG CONTROL REGISTER
BITS (DR7) DEBUG REGISTERS

| Field | Function |
|---|---|
| LEN0 LEN1 LEN2 LEN3 | For each of the registers DR0–DR3, there is a corresponding two-bit LEN field (LEN0, LEN1, LEN2 and LEN3, respectively). The LEN field specifies the operand length for which data accesses are monitored. Encodings are:<br>00 = one byte (Required for all Execution breakpoints)<br>01 = two bytes<br>10 = (reserved)<br>11 = four bytes<br>Note that for valid breakpointing, the address in the corresponding DR0–DR3 register must be aligned to a multiple of the length chosen here. |
| RWE0 RWE1 RWE2 RWE3 | For each of the registers DR0–DR3, there is a corresponding two-bit RWE field (RWE0, RWE1, RWE2 and RWE3, respectively). The RWE field specifies the conditions under which the corresponding address in DR0–DR3 will report a match. Encodings are:<br>00 = Execution as an instruction<br>01 = Data Write<br>10 = (reserved)<br>11 = Data Read or Write |
| G0/L0 G1/L1 G2/L2 G3/L3 | Global/Local Breakpoint Enables. These bits enable the breakpoint conditions to trigger the Debug Trap (Interrupt 1). For each Debug register (DR0–DR3), a trap is enabled if either the L or G bit contains a 1. The L bits differ from the G bits |

TABLE 2-continued

FUNCTIONS OF DEBUG CONTROL REGISTER
BITS (DR7) DEBUG REGISTERS

| Field | Function |
|---|---|
| | in that they are cleared whenever the processor performs a task switch. |
| GE/LE | Global/Local Exact Data Breakpoint Mode. These bits are remnants of the earlier 386 architecture, and are ignored by the processor. |
| GD | Global Debug Access Detect. When set to a 1, this bit causes any instructions that access any of the Debug registers to cause a Debug trap instead. The trap clears the GD bit, allowing code within the Debug trap service routine to access these registers, and sets the BD bit in DR6. This feature allows an In-Circuit Emulator (ICE) or other development-mode monitor to emulate these registers for the application system's code, while preventing that code from accessing them directly. |
| IM | In-Circuit Emulation Mode. This bit must be kept zero except when a specially bonded-out part is used in an in-circuit emulation environment. |

Figure 5:
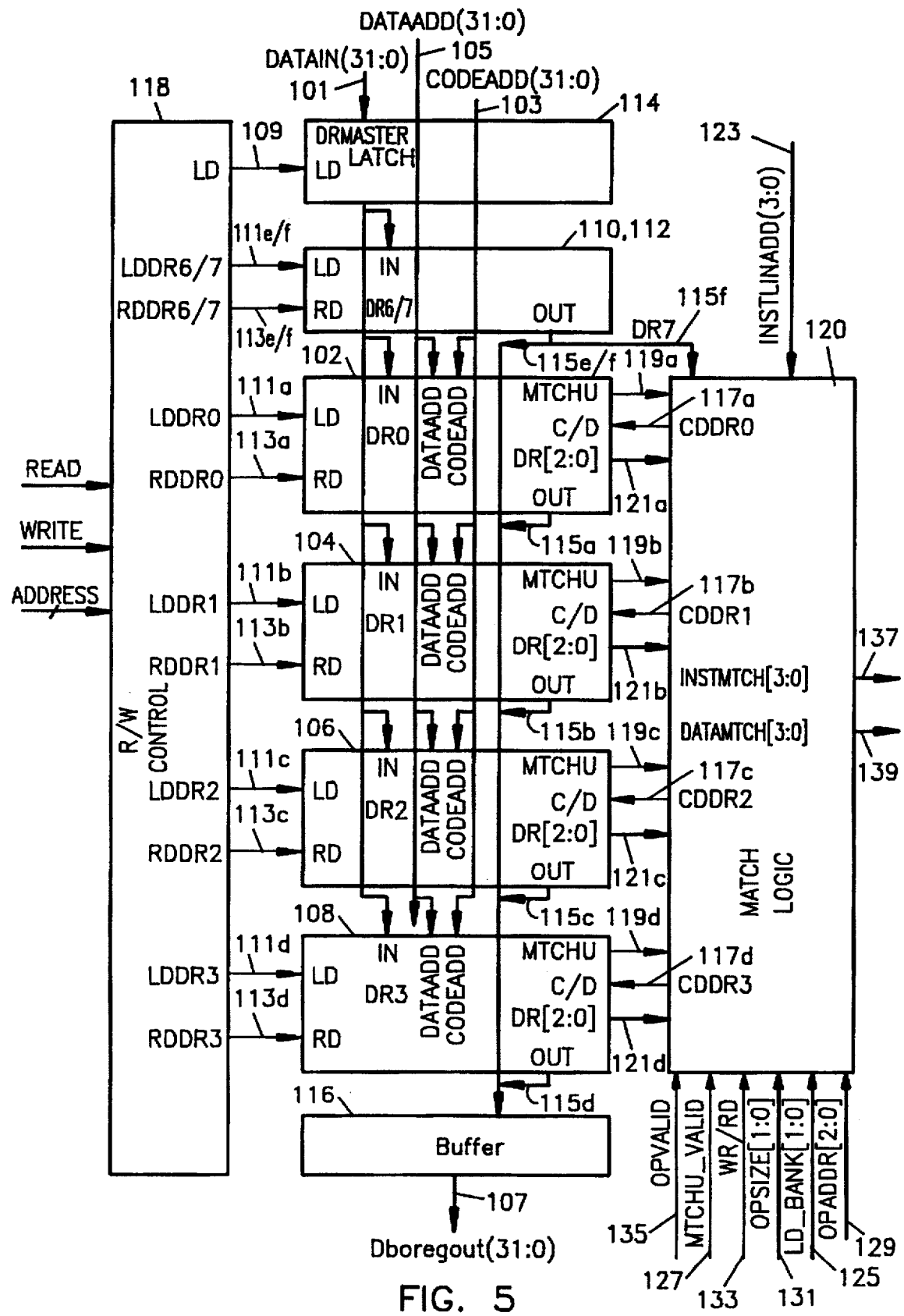
FIG. 5 is a functional block diagram of the debug registers of FIG. 4.

Referring to FIG. 5, the debug registers 102, 104, 106, 108, 110, 112 are interconnected with an input latch 114, output buffer 116, read/write control logic 118 and match logic 120. As noted above and discussed in more detail below, the debug address registers 102, 104, 106, 108 are programmed with data 101 representing address information for comparison with code address information 104 and/or data address information 105, while the debug control registers 110, 112 are programmed with data 101 representing control, configuration and status information. Additionally, the match logic 120 receives the four least significant bits (LSBs) 123 of the linear address of the first byte of the instruction whose address is being compared. Additionally, the match logic 120 receives a two-bit load signal 125, a match valid signal 127 identifying whether the match outputs 119 (discussed in more detail below) are valid, the three least significant bits 129 of the address of the operand whose address is being compared, a two-bit signal 131 representing the size of the incoming operand, a signal 133 identifying whether a write or read function is being performed, and a signal 135 identifying whether the incoming operand is valid. Based upon these input signals, the match logic 120 provides a four-bit instruction match signal 137 and a four-bit data match signal 139, depending upon whether address information for instructions or data are being compared. Further, the match logic 120 receives selected configuration, control and status information 115f from the second debug control register 112. Lastly, the match logic 120 provides select signals 117 for the debug address registers 102, 104, 106, 108 which perform a portion of the breakpoint address comparison (discussed in more detail below).

Figure 6:
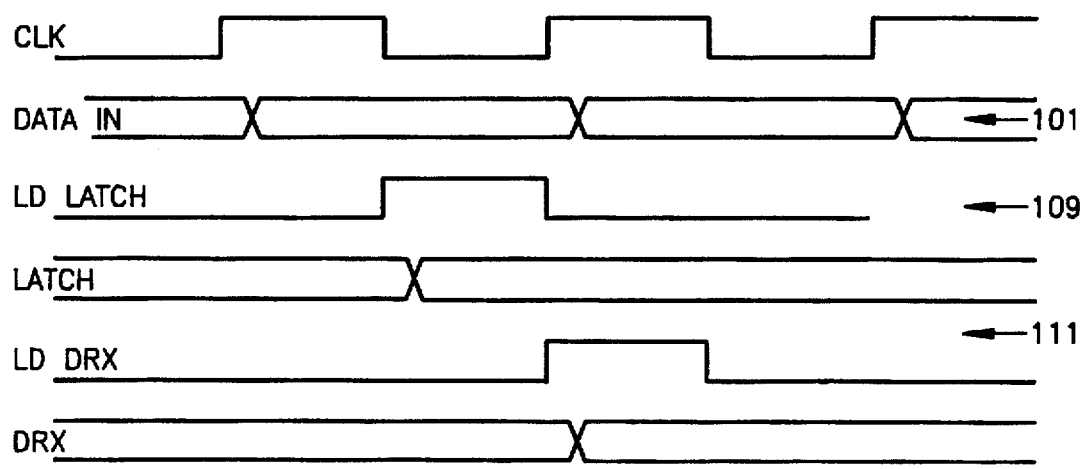
FIG. 6 is a signal timing diagram for the debug registers of FIG. 5.

In accordance with load signals 109, 111 from the read/write control logic 118, the input latch 114 and debug registers 102, 104, 106, 108, 110, 112 store the incoming data 101 representing either address information or control, configuration or status information. The input latch 114 acts as a "master" latch, while the debug registers 102, 104, 106, 108, 110, 112 act as "slave" registers. The relative timing relationships of the load signals 109, 111 and latching action of the input latch 114 and debug registers 102, 104, 106, 108, 110, 112 are illustrated in FIG. 6. Subsequently, the information stored in the debug registers 102, 104, 106, 108, 110, 112 is provided as an output signal 115 in response to a read signal 113 from the read/write control logic 118. These output signals 115 are buffered by the buffer 116 in a time-division-multiplexed manner to produce the output 107 of the debug section 100.

Each of the breakpoint debug address registers 102, 104, 106, 108 also receives the aforementioned code address 103 and data address 105 signals. As discussed in more detail below, the 29 most significant bits (MSBs) of each of these signals 103, 105 are selectively compared with the corresponding bits of the programmed address information 101. If a match exists between such bits, a match signal 119 is asserted and provided to the match logic 120. Also provided to the match logic 120 are the three LSBs 121 of the programmed address information 101.

Figure 7:
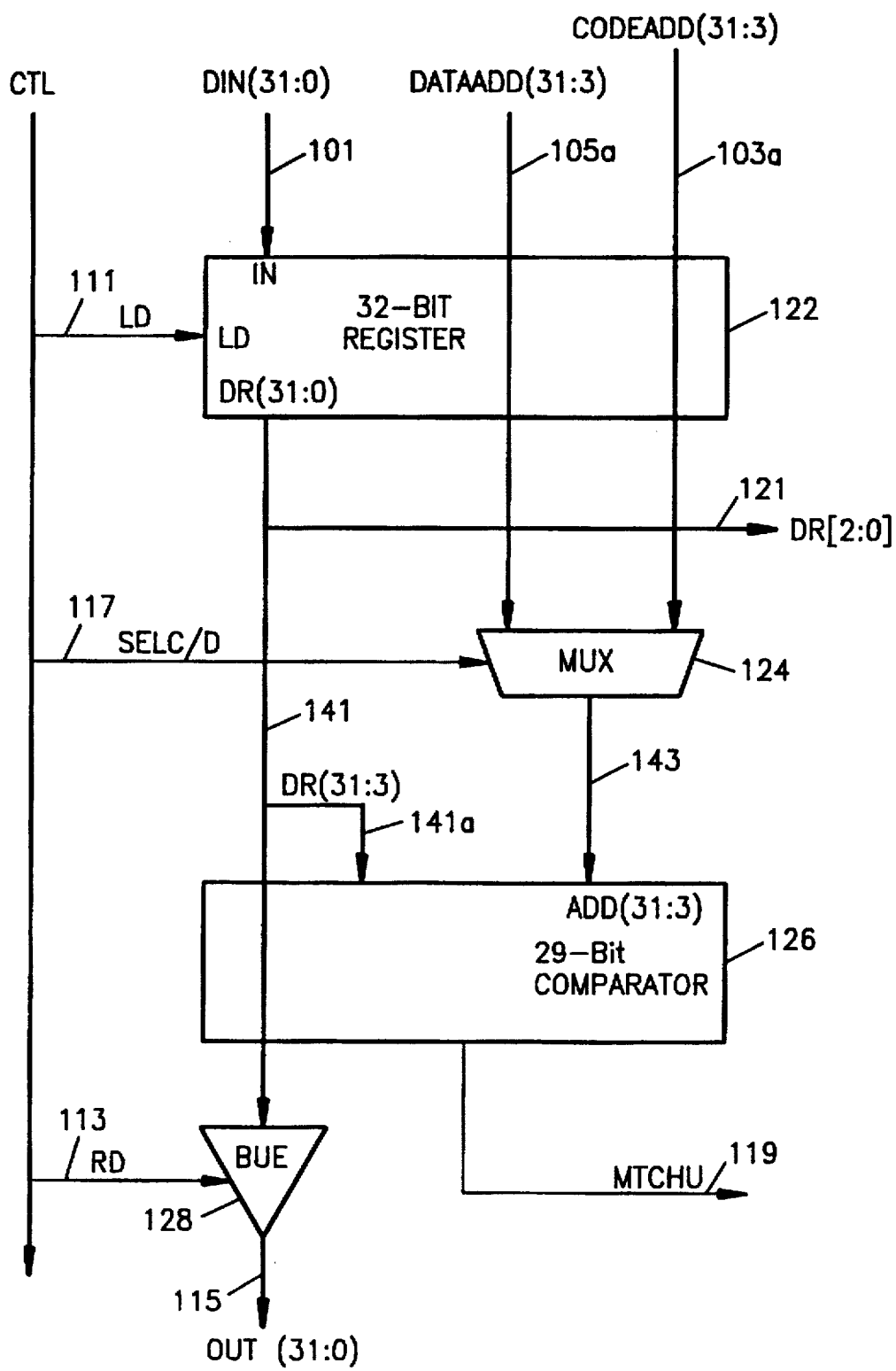
FIG. 7 is a functional block diagram of those debug registers of FIG. 5 used for breakpoint addresses.

Referring to FIG. 7, the storage and comparison functions of the breakpoint debug address registers 102, 104, 106, 108 can be better understood. The programmed address information 101 is stored in a register 122 in accordance with the load signal 111. Of this stored information, the least significant three bits 121 are provided for the match logic 120 (FIG. 5), while the 29 most significant bits 141 are provided to a digital comparator 126. Meanwhile, all 32 bits are provided to a buffer 128 for outputting in accordance with the read control signal 113.

Of the code address information 103 and data address information 105, the 29 MSBs 103a, 105a of each are provided to a multiplexor 124 which, in accordance with the select signal 117 from the match logic 120, provides one set 143 of such bits to a digital comparator 126. These bits 143 are compared with the 29 MSBs 141a of the programmed address information 141 and, if a match is found to exist, the match signal 119 is asserted.

Figure 8:
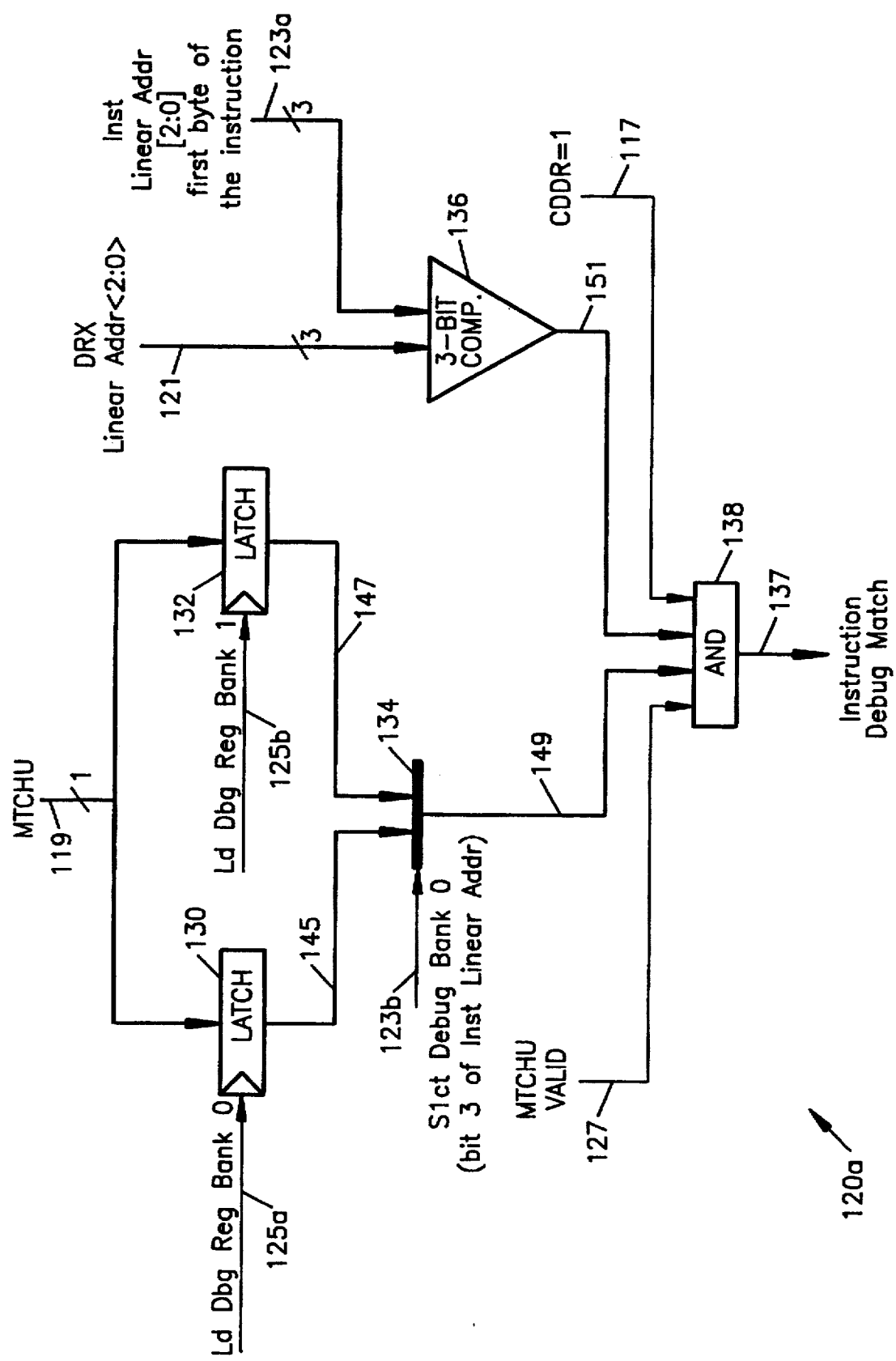
FIG. 8 is a functional block diagram of that portion of the match logic of FIG. 5 used for instruction address matching.

Referring to FIG. 8, operation of that portion 120a of the match logic 120 which determines whether an instruction breakpoint match has occurred can be better understood. The match signal bit 119 is stored in one of two latches 130, 132 in accordance with the two states 125a, 125b of the load signal 125. In other words, the match signal bit 119 is loaded into the first 130 and second 132 latches during assertion of the first 125a and second 125b states, respectively, of the load signal 125. During a prefetch request, the first 125a and second 125b states of the load signal 125 are asserted when the state of bit 3 of the prefetch pointer is a logic 0 and a logic 1, respectively. One of these stored bits 145, 147 is then selected by a multiplexor 134 in accordance with the most significant bit (bit 3) 123b of the four LSBs 123 of the instruction address, i.e. the address of the first byte of the instruction decoded by the decode stage 16 (FIG. 3).

The three LSBs 121 of the programmed address information 101 are compared in a three-bit comparator 136 with the three LSBs 123a of the instruction address 123. The resulting multiplexor output 149 and comparator output 121 are then logically ANDed with the match valid signal 127 and the multiplexor select signal 117 in an AND gate 138 to produce the instruction match signal 137.

When the instruction reaches the execution stage 18, and such instruction is to be executed, the code breakpoint is then taken.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA"; U.S. patent application Ser. No. 08/451,965, entitled "SERIAL INTERFACE CAPABLE OF OPERATING IN TWO DIFFERENT SERIAL DATA TRANSFER MODES"; U.S. patent application Ser. No. 08/453,076, entitled "HIGH PERFORMANCE MULTIFUNCTION DIRECT MEMORY ACCESS (DMA) CONTROLLER"; U.S. patent application Ser. No. 08/452,001, entitled "OPEN DRAIN MULTI-SOURCE CLOCK GENERATOR HAVING MINIMUM PULSE WIDTH"; U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION"; U.S. patent application Ser. No. 08/451,924, entitled "EXECUTION UNIT ARCHITECTURE TO SUPPORT x86 INSTRUCTION SET AND x86 SEGMENTED ADDRESSING"; U.S. patent application Ser. No. 08/451,444, entitled "BARREL SHIFTER"; U.S. patent application Ser. No. 08/451,204, entitled "BIT SEARCHING THROUGH 8, 16, OR 32-BIT OPERANDS USING A 32-BIT DATA PATH"; U.S. patent application Ser. No. 08/451,195, entitled "DOUBLE PRECISION (64-BIT) SHIFT OPERATIONS USING A 32-BIT DATA PATH"; U.S. patent application Ser. No. 08/451,571, entitled "METHOD FOR PERFORMING SIGNED DIVISION"; U.S. patent application Ser. No. 08/452,162, entitled "METHOD FOR PERFORMING ROTATE THROUGH CARRY USING A 32-BIT BARREL SHIFTER AND COUNTER"; U.S. patent application Ser. No. 08/451,434, entitled "AREA AND TIME EFFICIENT FIELD EXTRACTION CIRCUIT"; U.S. patent application Ser. No. 08/451,535, entitled "NON-ARITHMETICAL CIRCULAR BUFFER CELL AVAILABILITY STATUS INDICATOR CIRCUIT"; U.S. patent application Ser. No. 08/445,563, entitled "TAGGED PREFETCH AND INSTRUCTION DECODER FOR VARIABLE LENGTH INSTRUCTION SET AND METHOD OF OPERATION"; U.S. patent application Ser. No. 08/450,153, entitled "PARTITIONED DECODER CIRCUIT FOR LOW POWER OPERATION" now U.S. Pat. No. 5,546,353; U.S. patent application Ser. No. 08/451,495, entitled "CIRCUIT FOR DESIGNATING INSTRUCTION POINTERS FOR USE BY A PROCESSOR DECODER"; U.S. patent application Ser. No. 08/451,219, entitled "CIRCUIT FOR GENERATING A DEMAND-BASED GATED CLOCK"; U.S. patent application Ser. No. 08/451,214, entitled "INCREMENTOR/DECREMENTOR" now U.S. Pat. No. 5,583,453; U.S. patent application Ser. No. 08/451,150, entitled "A PIPELINED MICROPROCESSOR THAT PIPELINES MEMORY REQUESTS TO AN EXTERNAL MEMORY"; U.S. patent application Ser. No. 08/451,198, entitled "CODE BREAKPOINT DECODER"; U.S. patent application Ser. No. 08/445,569, entitled "TWO TIER PREFETCH BUFFER STRUCTURE AND METHOD WITH BYPASS"; U.S. patent application Ser. No. 08/445,564, entitled "INSTRUCTION LIMIT CHECK FOR MICROPROCESSOR"; U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE"; U.S. patent application Ser. No. 08/452,080, entitled "APPARATUS AND METHOD FOR EFFICIENT COMPUTATION OF A 486™ MICROPROCESSOR COMPATIBLE POP INSTRUCTION"; U.S. patent application Ser. No. 08/450,154, entitled "APPARATUS AND METHOD FOR EFFICIENTLY DETERMINING ADDRESSES FOR MISALIGNED DATA STORED IN MEMORY"; U.S. patent application Ser. No. 08/451,742, entitled "METHOD OF IMPLEMENTING FAST 486™ MICROPROCESSOR COMPATIBLE STRING OPERATION"; U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID"; U.S. patent application Ser. No. 08/451,507, entitled "DRAM CONTROLLER THAT REDUCES THE TIME REQUIRED TO PROCESS MEMORY REQUESTS"; U.S. patent application Ser. No. 08/451,420, entitled "INTEGRATED PRIMARY BUS AND SECONDARY BUS CONTROLLER WITH REDUCED PIN COUNT"; U.S. patent application Ser. No. 08/452,365, entitled "SUPPLY AND INTERFACE CONFIGURABLE INPUT/OUTPUT BUFFER"; U.S. patent application Ser. No. 08/451,744, entitled "CLOCK GENERATION CIRCUIT FOR A DISPLAY CONTROLLER HAVING A FINE TUNEABLE FRAME RATE"; U.S. patent application Ser. No. 08/451,206, entitled "CONFIGURABLE POWER MANAGEMENT SCHEME"; U.S. patent application Ser. No. 08/452,350, entitled "BIDIRECTIONAL PARALLEL SIGNAL INTERFACE"; U.S. patent application Ser. No. 08/452,094, entitled "LIQUID CRYSTAL DISPLAY (LCD) PROTECTION CIRCUIT"; U.S. patent application Ser. No. 08/451,503, entitled "IN-CIRCUIT EMULATOR STATUS INDICATOR CIRCUIT"; U.S. patent application Ser. No. 08/450,156, entitled "DISPLAY CONTROLLER CAPABLE OF ACCESSING GRAPHICS DATA FROM A SHARED SYSTEM MEMORY"; U.S. patent application Ser. No. 08/450,726, entitled "INTEGRATED CIRCUIT WITH TEST SIGNAL BUSES AND TEST CONTROL CIRCUITS" now U.S. Pat. No. 5,541,935; U.S. patent application Ser. No. 08/445,568, entitled "DECODE BLOCK TEST METHOD AND APPARATUS".

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a computer with a pipelined processor and code breakpoints for performing debug operations, said computer comprising:

a debug register for receiving and storing breakpoint information representing an address of one of a plurality of preselected instructions;

a prefetch stage for receiving and storing program address information representing one of a plurality of program instructions and in accordance therewith receiving and storing binary information representing said one of said plurality of program instructions;

a decode stage, coupled to said prefetch stage, for receiving and decoding said stored binary information and in accordance therewith providing decoded binary information representing said one of said plurality of program instructions;

an execution stage, coupled to said decode stage, for receiving said decoded binary information and executing an operation in accordance with said decoded binary information;

a first comparison stage, coupled to said debug register and said prefetch stage, for receiving and comparing a first portion of said stored breakpoint information and a first portion of said stored program address information and in accordance therewith providing a first address match signal which indicates whether said first portions of said stored breakpoint and program address information match one another, wherein said comparison of said first portions of said stored breakpoint and program address information is performed simultaneously with said storing by said prefetch stage of said binary information representing said one of said plurality of program instructions; and a second comparison stage, coupled to said first comparison stage, said debug register and said prefetch stage, for receiving and comparing a second portion of said stored breakpoint information and a second portion of said stored program address information and in accordance therewith providing a second address match signal which indicates whether said first and second portions of said stored breakpoint information match said first and second portions of said stored program address information, respectively.

2. The apparatus of claim 1, wherein said comparison of said second portions of said stored breakpoint and program address information is performed subsequent to said receiving and storing by said prefetch stage of said binary information representing said one of said plurality of program instructions.

3. The apparatus of claim 1, wherein said comparison of said second portions of said stored breakpoint and program address information is performed simultaneously with said decoding by said decode stage of said stored binary information.

4. The apparatus of claim 1, wherein said comparison of said second portions of said stored breakpoint and program address information is performed simultaneously with said executing by said execution stage of an operation in accordance with said decoded binary information.

5. The apparatus of claim 1, wherein said first portion of said stored breakpoint information comprises a majority of said stored breakpoint information and said first portion of said stored program address information comprises a majority of said stored program address information.

6. The apparatus of claim 1, wherein said second portion of said stored breakpoint information comprises N bits of said stored breakpoint information, said second portion of said stored program address information comprises N bits of said stored program address information, said stored program address information includes B bytes of binary bits and $2^N=B$.

7. The apparatus of claim 1, wherein said stored program address information includes B bytes of binary bits, and wherein said providing of said second address match signal which indicates whether said first and second portions of said stored breakpoint match said first and second portions of said stored program address information, respectively, is done in accordance with bit A of said stored program address information, and further wherein $2^A=B$.

8. A method of performing debug operations with code breakpoints in a computer with a pipelined processor, said method comprising the steps of:

storing breakpoint information representing an address of one of a plurality of preselected instructions;

storing program address information representing one of a plurality of program instructions;

in accordance with said stored program address information, storing binary information representing said one of said plurality of program instructions;

decoding said stored binary information and in accordance therewith providing decoded binary information representing said one of said plurality of program instructions;

executing an operation in accordance with said decoded binary information;

simultaneously with said storing of said binary information representing said one of said plurality of program instructions, comparing a first portion of said stored breakpoint information and a first portion of said stored program address information;

in accordance with said comparison of said first portions of said stored breakpoint and program address information, providing a first address match signal which indicates whether said first portions of said stored breakpoint and program address information match one another;

comparing a second portion of said stored breakpoint information and a second portion of said stored program address information; and in accordance with said comparison of said second portions of said stored breakpoint and program address information, providing a second address match signal which indicates whether said first and second portions of said stored breakpoint information match said first and second portions of said stored program address information, respectively.

9. The method of claim 8, wherein said step of comparing a second portion of said stored breakpoint information and a second portion of said stored program address information is performed subsequent to said step of storing binary information representing said one of said plurality of program instructions.

10. The method of claim 8, wherein said step of comparing a second portion of said stored breakpoint information and a second portion of said stored program address information is performed simultaneously with said step of decoding said stored binary information and in accordance therewith providing decoded binary information representing said one of said plurality of program instructions.

11. The method of claim 8, wherein said step of comparing a second portion of said stored breakpoint information and a second portion of said stored program address information is performed simultaneously with said step of executing an operation in accordance with said decoded binary information.

12. The method of claim 8, wherein said step of comparing a first portion of said stored breakpoint information and a first portion of said stored program address information comprises comparing a majority of said stored breakpoint information and a majority of said stored program address information.

13. The method of claim 8, wherein said step of comparing a second portion of said stored breakpoint information and a second portion of said stored program address information comprises comparing N bits of said stored breakpoint information and N bits of said stored program address information, and wherein said stored program address information includes B bytes of binary bits and $2^N=B$.

14. The method of claim 8, wherein said step of providing a second address match signal which indicates whether said first and second portions of said stored breakpoint information match said first and second portions of said stored program address information, respectively, comprises providing said second address match signal in accordance with bit A of said stored program address information, and wherein said stored program address information includes B bytes of binary bits and $2^A=B$.

* * * * *